United States Patent [19]

Benjamin

[11] 4,241,302

[45] Dec. 23, 1980

[54] CAPACITIVE BRAKING SWITCHING SYSTEM FOR HOME APPLIANCES WITH INDUCTION MOTOR DRIVE

[75] Inventor: Daniel R. Benjamin, North Tarrytown, N.Y.

[73] Assignee: Cuisinarts, Inc., Greenwich, Conn.

[21] Appl. No.: 22,040

[22] Filed: Mar. 19, 1979

[51] Int. Cl.³ .............................................. H02P 3/18
[52] U.S. Cl. .................................... 318/758; 318/759
[58] Field of Search .............................. 318/757–759; 219/10.55 C; 361/115

[56] References Cited

U.S. PATENT DOCUMENTS

| | | | |
|---|---|---|---|
| 2,463,697 | 3/1949 | Kipper | 318/757 X |
| 2,839,712 | 6/1958 | Appleman | 318/759 |
| 3,038,109 | 6/1962 | Mowery, Jr. et al. | 318/757 X |

*Primary Examiner*—Gene Z. Rubinson
*Attorney, Agent, or Firm*—Parmelee, Johnson, Bollinger & Bramblett

[57] ABSTRACT

An improved capacitive braking system is provided for fractional Horsepower induction motors in home appliances, for example in a food processor of the type having a working bowl mounted on a housing containing the induction motor, with a shaft in the bowl for removably supporting a rotary food processing tool to be driven by the induction motor. The new braking system rapidly halts the coasting motion of the motor rotor and tool after the motor has been disconnected from the electric power line. A first switch is provided to control the application of electrical energy to the induction motor for sustained operation, and a second "pulse" switch is provided to control the application of electrical energy to the induction motor for brief surges of momentary operation. The braking system includes a second capacitor which is external to the induction motor and distinct from the starting capacitor normally associated with an induction motor. In the preferred embodiment, this second capacitor becomes connected in circuit with the windings of the induction motor to provide an enhanced braking effect upon disconnection of the induction motor from the electric power, said second capacitor having a capacitance larger than that of the starting capacitor for producing a resonant magnetic field braking action on the coasting rotor. The first and second switches are advantageously arranged and interconnected so that it is not possible inadvertently to connect either capacitor across the line voltage, thus avoiding the possible destruction of the capacitors by the line voltage, regardless of the order in which the switches are actuated by the user.

8 Claims, 6 Drawing Figures

RESULTING MOTOR BRAKING CIRCUIT OF FIG. 1 WHEN MOTOR IS TURNED OFF WITH COVER IN PLACE. THIS CIRCUIT EFFECTIVELY UTILIZES BOTH CAPACITORS.

RESULTING MOTOR BRAKNG CIRCUIT OF FIG. 1. WHEN COVER IS REMOVED WITH ONE OF SWITCHES 13 OR 15 TURNED ON. THIS CIRCUIT IS EFFECTIVELY THE SAME AS FIG. 3.

RESULTING MOTOR BRAKING CIRCUIT OF FIG. 2 IS EFFECTIVELY THE SAME WHETHER MOTOR IS TURNED OFF WITH COVER IN PLACE (FIG. 5) OR COVER IS REMOVED WITH ONE OF SWITCHES 13 OR 15 TURNED ON (FIG. 6).

CAPACITIVE BRAKING SWITCHING SYSTEM FOR HOME APPLIANCES WITH INDUCTION MOTOR DRIVE

FIELD OF THE INVENTION

The present invention relates to the control of fractional Horsepower induction motors of the type used in household appliances. More particularly the invention relates to a capacitive braking switching system for quickly stopping the rotation of the induction motor after the appliance has been turned off, for example such as in a food processor containing a sharp rotary food processing tool.

BACKGROUND OF THE INVENTION

In a home appliance involving moving parts it is desirable that the motion quickly stop after the electric power is turned off to avoid possible injury to the user. In those appliances driven by fractional horsepower induction motors, the rotor of the motor is relatively heavy and moreover the coasting motor is very quiet as compared to a fractional Horsepower universal-type electric motor having a commutator and brushes, so that the user is not audibly alerted to the continuing coasting motion of the induction motor and the associated driven parts. This quiet coasting particularly occurs in induction-motor-driven food processors.

Such food processors are kitchen appliances utilizing a variety of interchangeable rotary tools, as for example, knives, blades, cutting discs, and rasping discs for performing such operations as cutting, slicing, mixing, blending, grating, shredding, chopping and pureeing, etc.

Known food processors generally include a supporting base structure having an induction motor encased therein, a work bowl adapted to be seated on the supporting base with a driveable shaft in the work bowl. The specific rotary tool needed for a desired food processing application is removably mounted on the shaft. When the motor is actuated, such a tool spins rapidly within the work bowl. A cover having an opening is removably mounted to the top of the work bowl. Food to be processed is inserted through the opening in the cover and into the work bowl to be processed by the rotary tool.

Fractional Horsepower single-phase powered induction motors of the type generally referred to above are used in many such food processors. Such induction motors are energized by single-phase electric power and so they include a main winding and an auxiliary starter winding. There is a phase-shifting electric component connected in series with the auxiliary winding, such component usually being a capacitor, and the starting winding is energized briefly to start rotation of the motor. The specific tools used by the appliance are rotated at relatively high speeds during operation to perform their required functions.

In known food processors, the induction-motor-driven rotary tool can revolve at speeds of approximately 1,800 RPM. Thus, it is important that the processor include a braking system which will minimize coasting of the rotary tool after the motor has been de-energized. Such braking systems provide the user with quick access to the processed food in the work bowl and also minimize the possibility of injury to the hands of a user if inserted into the bowl prematurely or inadvertently.

Home appliances such as food processors are often equipped with protective switches which automatically shut off the power when a cover is removed from the zone where the tool is located. Nevertheless, the coast-down time may exceed the time taken to remove the cover and lay it aside. Thus a quickly moving user might be able to remove the cover and insert fingers or hand into the tool zone with consequent injury from the still coasting tool.

In known braking systems for induction motors, as for example the one illustrated in U.S. Pat. No. 2,613,342, a starting capacitor of the induction motor is electrically coupled to the windings of the induction motor to produce an electromagnetic braking effect within the motor when a control switch is in the "off" position, the braking effect is produced by converting the rotational mechanical energy into electrical energy which is quickly dissipated as heat.

If the induction motor is placed under a heavy load it slows down, thereby drawing on increased current, and the starting switch becomes closed placing the starting winding and starting capacitor in circuit. Under such circumstances, if the starting switch is suddenly turned OFF, damage can result to the ON-OFF switch in a circuit as shown in FIG. 1 of the Thompson patent, because the starting and running windings both suddenly become connected effectively in parallel across the switch contacts. Their sudden deenergization under such circumstances often produces severe electric arcing within the switch in my experience. When a fast-acting ON-OFF switch is used in a circuit as shown in FIG. 1 of the Thompson patent I consider it to be a "switch killer" whenever the induction motor is turned OFF under such a heavy load that the starting switch is closed.

In practice, when the motor is turned OFF under no load with a conventional size starting capacitor, it has been found that in a braking system as described above, the braking effect afforded by the starting capacitor of the induction motor is not so great as desired. To overcome this difficulty, it has been proposed electrically to connect a second capacitor into the braking circuit. For example, please see FIG. 2 of the previously mentioned U.S. Pat. No. 2,613,342—Thompson.

However, providing a braking circuit with the above described second capacitor has resulted in difficulties. For example, if the second capacitor is inadvertently connected across the line voltage, it is likely to be destroyed. In said patent there is employed a double-pole, double-throw (DPDT) switch which is inherently slow-acting because there is an intermediate position (namely, the position as shown in FIG. 2 of said patent) through which the switch arms must be moved and during which interval the switch is wide open so that no braking at all is occurring. In Column 2, lines 8-14, Thompson states:

"The single pole double throw switch 12 may be replaced by a different switch, for example a drum or magnetic switch, which allows instantaneous shifting from running to braking positions and which has no 'coast' position such as is present in switch 12 when it is closed to neither terminal."

This text implicitly recognizes the slow action of the switching circuit shown, and drum or magnetic switches are complex, not being suitable for a home appliance such as a food processor. Moreover, Thompson does not suggest the use of drum or magnetic switches to replace the DPDT switch in FIG. 2, which is the circuit actually containing a second capacitor.

Although Thompson shows a second capacitor in FIG. 2 this added capacitor 16 is actually useless during the major portion of the coasting time, because it soon becomes short-circuited by the starting switch 7. Since such a starting switch normally closes slightly below the normal running speed of the motor, the added capacitor 16 is rendered useless during the major portion of the time when the motor is being slowed down. Consequently, only the starting capacitor alone is of much effect in the Thompson circuit. This lack of much utility in the added capacitor is tacitly admitted since only the capacitance value of the starting capacitor is set forth in the table in Column 3, and no value is given for the added capacitor.

SUMMARY OF THE ILLUSTRATIVE EMBODIMENTS

It is a primary object of the present invention to provide an improved capacitive braking switching system for an induction motor in a food processor including a second capacitor and a switching system designed to assure that neither this second capacitor nor the starting capacitor and winding can inadvertently be connected across the line voltage, regardless of the order in which the user may actuate the various switches, thereby eliminating the possible destruction of such capacitors or possible damage to the starting winding, while simultaneously providing a very fast-acting braking system for quickly stopping the appliance when it is turned off.

Among the advantages of the illustrative embodiments of the invention in a food processor are that they avoid the use of DPDT switches and consequently are efficient in saving of materials.

The preferred embodiments of the present invention are directed to an improved capacitive braking switching system for minimizing the coasting time of a spinning rotor of an induction motor in a food processor after the motor has been shut off. The claimed braking system includes the starting capacitor of an induction motor and a second capacitor, separate from the starting capacitor, and having a capacitance from 2 to 10 times larger than the capacitance of the starting capacitor, said second capacitor becoming connected to the windings of the induction motor to produce an electromagnetic braking effect after the induction motor has been turned off using resonance between the capacitors and the windings for optimally converting the rotational mechanical energy into electrical energy which is quickly dissipated, for suddenly stopping the motor.

This improved capacitive braking switching system includes a switching network arranged so that neither the second capacitor nor the starting capacitor can be connected across the power lines when the line voltage is applied to the motor during operation. The switching network includes first and second switches which are shown interposed between one of the leads of the power cord and the induction motor. Each of these two switches is connected to the power cord for providing electrical energy to actuate the induction motor, but one is electrically dependent on the other so that it cannot supply power to the motor unless the other is in its ("OFF") position.

The first switch can hold itself in its closed ("ON") position for causing sustained operation of the motor, while the second switch is a spring-biased push switch for providing momentary energization (so called "pulse operation") of the motor only for as long as this switch is being manually depressed. A mechanical interlock may be provided so that depression of the second switch automatically shifts the first switch from its closed ("ON") position to its open ("OFF") position.

The first and second switches are interdependently electrically connected as mentioned above so that the second capacitor is only in circuit with the induction motor when both the first and second switches are simultaneously in an open ("OFF") position. When both switches are open, line voltage cannot be applied to the motor circuit, and consequently cannot be applied to either the second capacitor or to the starting capacitor and starting winding thereby protecting the second capacitor and the starting capacitor and winding from inadvertent application of the line voltage thereto.

The preferred embodiments further include two safety switches, one of which prevents energization of the motor unless the cover is firmly secured in proper locked position to the work bowl of the food processor, and the other of which prevents energization of the motor unless the work bowl itself is securely seated in proper position in its supporting base.

BRIEF DESCRIPTION OF THE DRAWINGS

Further objects, features, aspects and advantages of this invention will be more fully understood from a consideration of the following detailed description taken in connection with the accompanying drawings, in which.

DETAILED DESCRIPTION OF THE PREFERRED EMBODIMENTS

Figure 1:
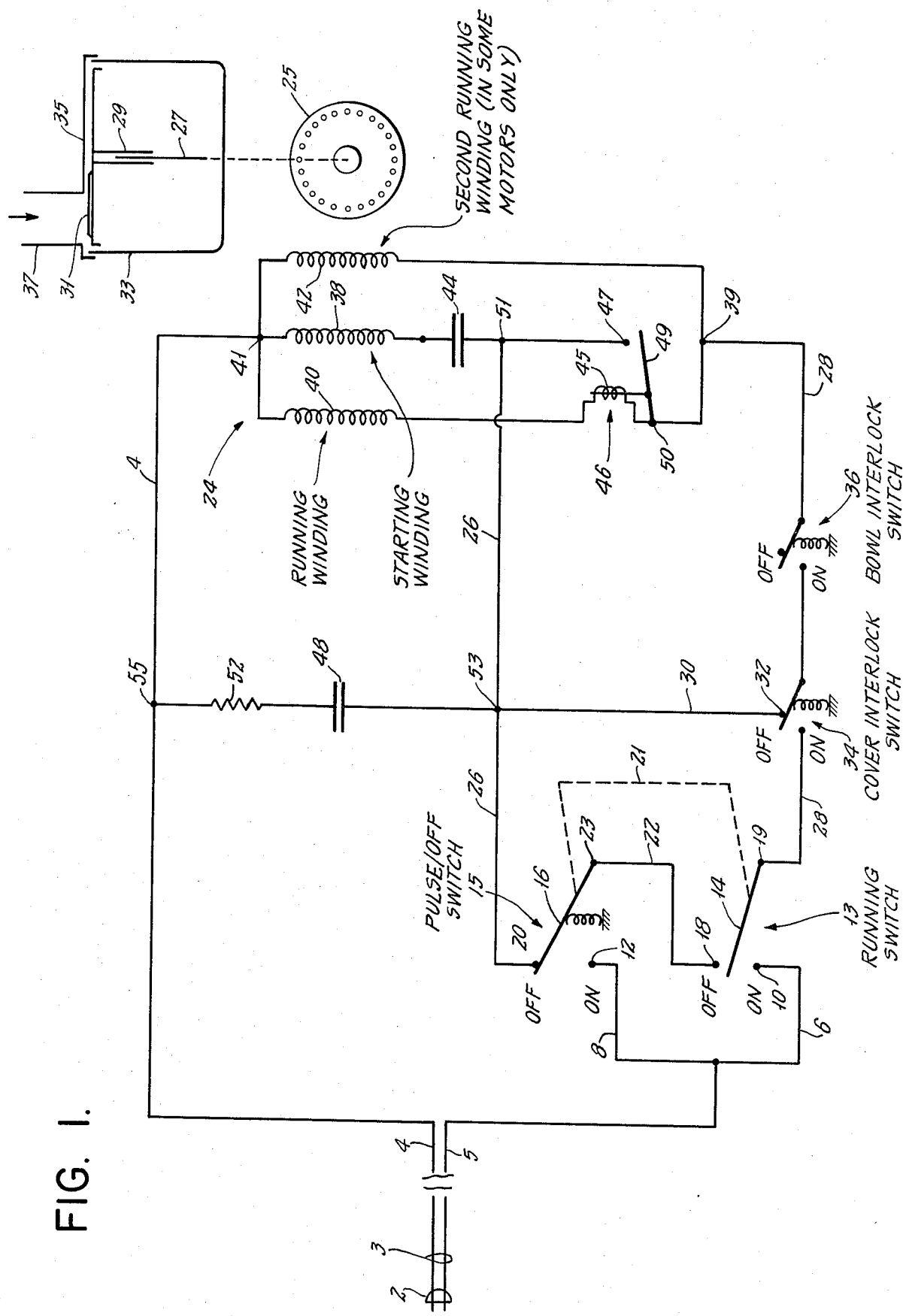
FIG. 1 is a schematic electrical circuit diagram of a capacitive braking switching system embodying the present invention in a food processor.

FIG. 1 of the drawings illustrates a first embodiment of the new capacitive braking switching system for an induction-motor-driven food processor. An electrical plug 2 on a power cord 3 is adapted to be connected to an external electrical source as for example, a typical outlet socket in a kitchen. The power cord 3 includes wires 4 and 5. In the event that the motor housing is of the type intended to be grounded, then line 4 should be connected to the neutral power line of the external source, and the switches should be associated with wire 5 intended to be connected to the "hot" side of the external electrical source. The circuit as actually shown in FIG. 1 is intended for a so-called double-insulated induction motor 24 in which the housing of the food processor is of a rigid plastic material and no "grounding" is necessary, and thus it does not matter which line 4 or 5 is the "hot" line.

The hot lead wire 5 branches into two lines 6 and 8 which are connected to electrical terminals 10 and 12, of first and second switches 13 and 15, respectively. The first switch 13 includes an arm 14 which is movable between an electrical contact 18 and the electrical terminal 10, while the second switch 15 includes an arm 16 which is movable between an electrical contact 20 and the electrical terminal 12. An electrical lead 22 connects switch arm terminal 23 with the electrical contact 18 of the other switch. Therefore the second switch 15 is made electrically dependent upon the first switch 13, because the second switch is totally ineffective in either of its possible positions unless the first switch is in the ("OFF") position.

In summary, assuming that the interlock switches to be described are closed, the electrical circuit to the induction motor 24 can only be made if (1) switch arm 14 is in contact with terminal 10 or (2) switch 16 is in contact with terminal 12 while also the switch arm 14 is in contact with the contact 18 ("OFF").

The first switch 13 is intended for normal continuous running operating, while the second switch 15 is shown as a spring-biased-to-open switch which is intended for providing momentary operation only so long as the switch is manually depressed. This momentary operation may be called "PULSE" operation or may be referred to as "JOG" operation.

In other words, the electrically independent first switch 13 is shown as the "RUNNING" switch, and the electrically dependent switch 15 is shown as the "PULSE" switch. This is my preferred arrangement. It is possible to reverse their roles and to use the second (dependent) switch as the "RUNNING" switch and the first (independent) switch as the "PULSE" switch, in which case the first switch is then spring-biased-to open instead of the second one.

Whichever is used as the RUNNING switch, it is of a type which can hold itself in its ON position for producing sustained running operation of the motor, for example it may be a toggle switch. There may be a mechanical trip linkage 21 between the PULSE switch and the RUNNING switch, so that depression of the PULSE switch automatically causes the RUNNING switch to be turned OFF. Consequently, the PULSE switch may be labeled as a "PULSE/OFF" switch.

My preference is to omit the mechanical interlock 21. Thus, the user must manually flip the RUNNING switch OFF when intending to use the PULSE operating switch. Even if the user holds the PULSE switch ON and flips the RUNNING switch back and forth between its ON and OFF positions no damage can occur to any of the components in the circuits shown in FIG. 1 and FIG. 2.

The rotor 25 of the induction motor 24 drives a tool shaft 27 on which the hub 29 of a rotary food processing tool 31 is mounted, this tool including sharp cutting, slicing or shredding blades, etc. This tool 31 is shown positioned in a work bowl 33 having a removable cover 35, with a feed tube 37 through which food items can be fed into the bowl to be processed by the rotary tool 31.

The arm terminal 19 of the first switch 13 is electrically connected to the induction motor 24 by an electrical line 28 with spring-biased-to-open switches 34 and 36 interposed in series in this line 28 connected to the motor terminal 39. Switch 34 is a cover interlock switch which is only in its motor-energizing ("ON") position when the cover is properly locked in place on the work bowl, while switch 36 is a work bowl interlock switch which is only in its motor-energizing ("ON") position when the bowl is properly mounted on the housing of the food processor. These switches, which assure safe operation of a food processor, are known to those skilled in the art and are only briefly discussed. They assure that the food processor can only be operated if the cover is firmly engaged in place over the work bowl and the work bowl is properly seated and locked in place on its supporting base. The power line 4 is connected to the other terminal 41 of the motor leading directly to one side of all of the motor windings, sometimes called the "common side" of the induction motor.

Figure 2:
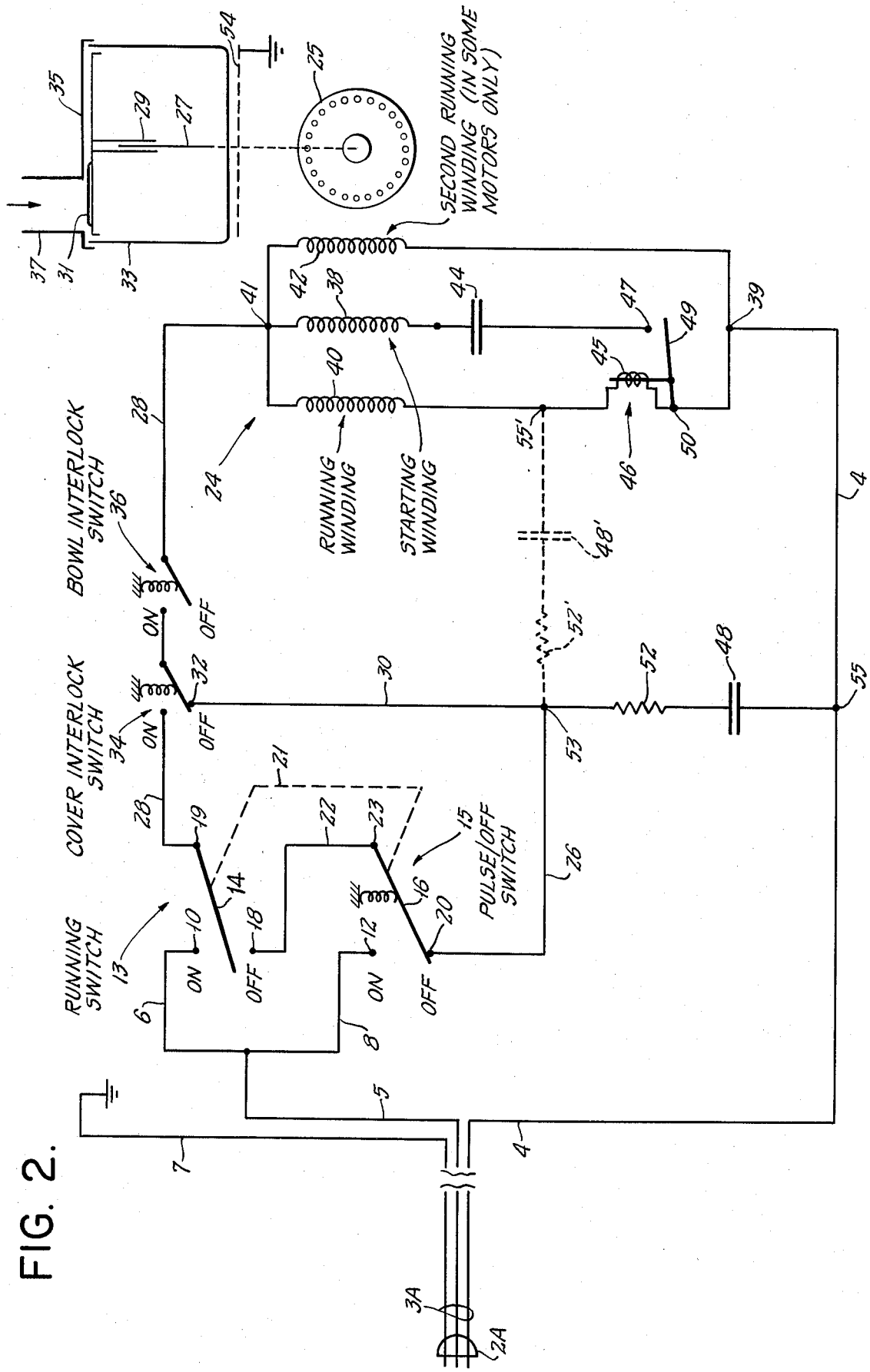
FIG. 2 is another schematic electrical circuit diagram of a second capacitive braking switching system embodying the present invention.

The induction motor 24 includes a starting winding 38 and a running winding 40. Some fractional-Horsepower induction motors 24 are manufactured with a second running winding 42 connected in parallel with the first running winding 40. The usual reason for having this second running winding 42 is so that the motor 24 is readily adaptable for operation on either 120 volts or 240 volts. For 120 volt operation the two running windings 40 and 42 are effectively used in parallel as shown in FIGS. 1 and 2. For 240 volt operation they are effectively used in series as known in the art of induction motors. A starting capacitor 44 is connected in series with the starting winding 38 and the terminal 47 of the starting relay 46. The other terminal 50 of the relay is connected both to the solenoid winding 45 and to the motor terminal 39. Thus, the solenoid winding 45 is always in series with the running winding 40. Abnormally large current flow through the running winding 40 during starting or the imposition of a heavy load on the motor 24, for example as may occur when mixing dough in a food processor, will cause the relay arm 48 to be pulled into contact with the terminal 47. Induction motors using starting capacitors are well known to those skilled in the art and will not be discussed in detail. When the food processor is ready for operation with the bowl 33 and cover 35 in place, both interlock switches 34 and 36 are in their "ON" positions. If switch 13 is then turned ON or if switch 15 is depressed to ON position with switch 13 in OFF position the motor will start and almost immediately accelerate to full running speed.

During starting, the momentary large current flow through the solenoid winding 45 briefly closes the relay arm 49 against the contact 47, thereby placing the starting winding 38 and starting capacitor 44 in circuit with the running winding(s). After the induction motor has started and has accelerated almost up to full running speed, the relay 46 automatically disconnects its arm 49 from the terminal 47, thereby removing the starting winding and capacitor from the circuit.

The starting capacitor 44 normally has a capacitance value of a size to cause the current through the starting winding 38 to be approximately 90° out of phase with the current through the running winding(s) for producing a strong starting torque.

In order to provide a greatly enhanced braking action, there is a second capacitor 48 in series with a resistor 52 connected in circuit between the motor terminal 41 and a connection point 51. This latter point 51 is located between the starting capacitor 44 and the relay terminal 47. The capacitor 48 is chosen to have a capacitance value considerably larger than the capacitance of the starting capacitor 4. Advantageously, the capacitance value of this capacitor 48 is chosen to be resonant with the running winding 40 (or with both running windings 40 and 42 in parallel if the second winding 42 is present) at a frequency in the range from approximately 15 Hz to 40 Hz for producing quick-acting powerful braking action, as will be explained further below.

A connection lead 26 extends from the connection point 51 to the connection point 53 leading to the series-connected capacitor 48 and resistor 52, and this lead 26 continues over to the OFF terminal 20 of the electrically dependent switch 15. A lead 30 extends from the connection point 53 to the OFF terminal 32 of the cover interlock switch 34.

Figure 3:
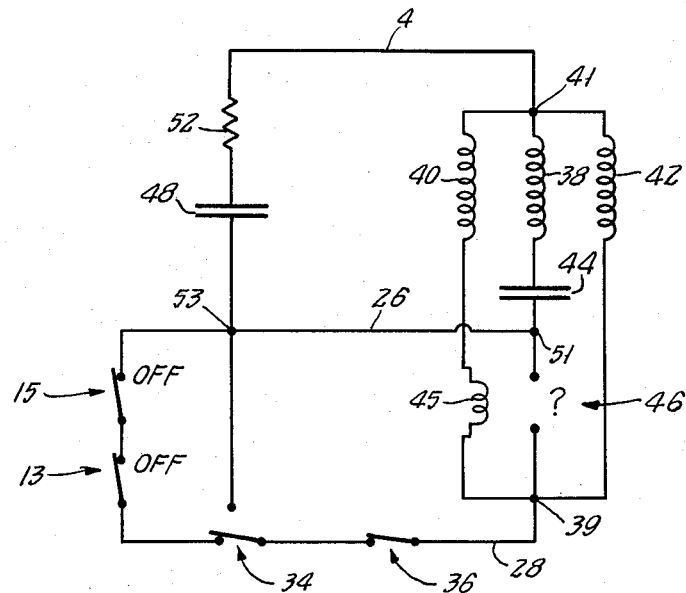
FIG. 3 shows the resulting motor braking circuit of FIG. 1 when the motor is turned OFF by the switch 13 or 15 with the cover in place.
Figure 4:
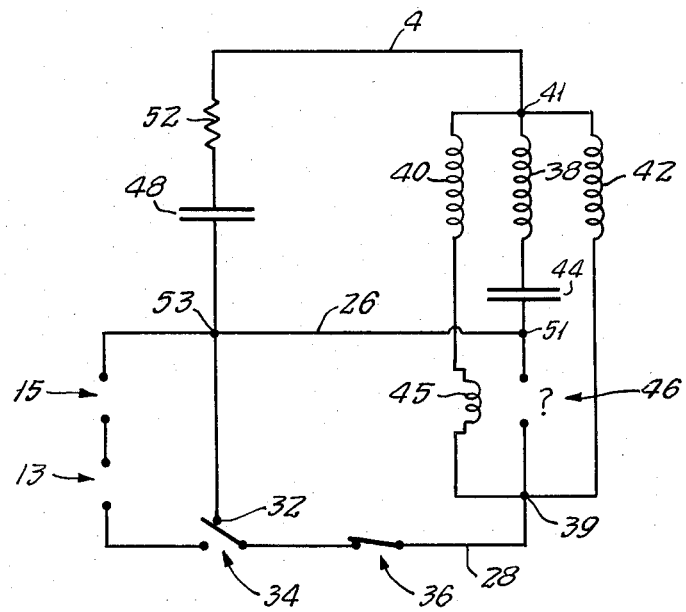
FIG. 4 shows the resulting motor braking circuit of FIG. 1 when the cover is removed with one of the switches 13 or 15 in the ON position.

Thus, advantageously, as illustrated in FIGS. 3 and 4 the resulting motor braking circuit is effectively the same regardless of whether the motor is turned OFF by one of the switches 13 or 15 with the cover in place or whether the cover is removed with one of the switches 13 or 15 turned ON. Moreover, the braking circuit remains effectively the same regardless of whether the starting relay 46 is open or closed. Therefore, both the starting capacitor 44 and the second capacitor 48 are always included and being utilized as the coasting motor is almost instantaneously slowed down to only a few RPM.

The starting capacitor 44 is very effective in producing braking action as the motor starts to slow down, for it tends to be resonant with the starting and running winding(s) at approximately normal running RPM thereby producing significant current flow with considerable conversion of rotational mechanical energy into electrical energy being dissipated as heat. The second capacitor 48 having a capacitance value considerably larger than the capacitance of the starting capacitor 44 tends to be resonant with the starting and running windings at approximately 15 to 40 Hz, namely when the rotor is turning at approximately half speed, thereby producing very effective braking action as the rotor quickly slows down to half speed and below. This advantageous simultaneous dual action of both capacitors during the full, powerful and quick braking action is quite different from the operation of the Thompson circuit described above.

FIG. 2 discloses a second embodiment of the capacitive braking switching system for use in a food processor in which the metal chassis 54 of the machine is grounded by ground wire 7. The plug 2A is of the three-prong type, and the power cord 3A includes the grounding wire 7. In FIG. 2 those elements performing the same functions as in FIG. 1 have the same reference numbers. It is to be noted that the hot line connection 28 is shown extending to the motor terminal 41 at the "common side" of the motor circuit. The series-connected capacitor 48 and resistor 52 are in circuit between the connection point 53 and a second connection point 55 located on the opposite side of the motor circuit from the common side 41. I call this opposite terminal 39 of the motor the "relay side."

As an alternative, it is possible to locate this second connection point 55 at the position 55' between the relay winding 45 and the running winding 40. If there is a second running winding 42, then either of the two locations of this point at 55 or at 55' is equally effective. If there is only one running winding 40, then the point 55' is preferred because it omits the relay winding 45 from the braking circuit.

Although the hot power line 5 is shown connected to the common motor terminal 41 in FIG. 2 this is not a necessary condition, for the hot side of the power line may be connected to the relay side 39 of the motor with the switches therein as shown in FIG. 1. The circuit of FIG. 2 is shown because it is another embodiment of the motor braking circuit.

Figure 5:
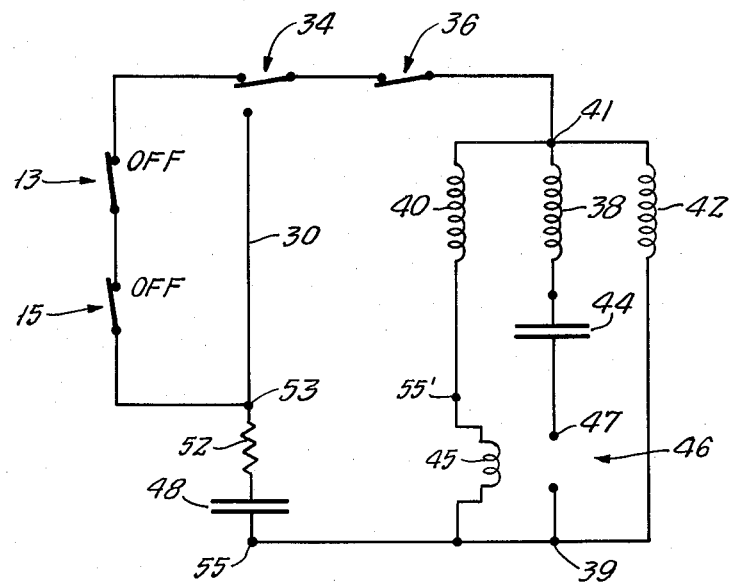
FIG. 5 shows the resulting motor braking circuit of FIG. 2 when the motor is turned OFF by switch 13 or 15 with the cover in place.
Figure 6:
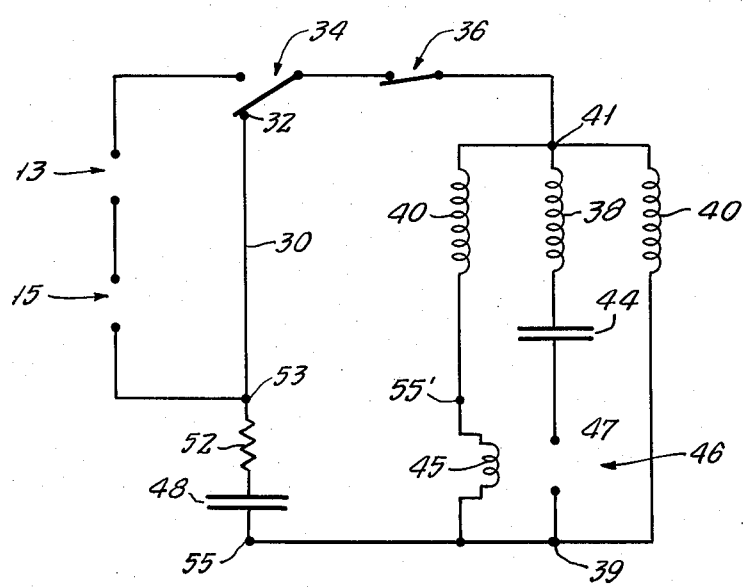
FIG. 6 shows the resulting motor braking circuit of FIG. 2 when the cover is removed with one of the switches 13 or 15 in the ON position.

As illustrated in FIGS. 5 and 6, the resulting motor braking circuit of FIG. 2 is effectively the same regardless of whether the motor is turned OFF by one of the switches 13 or 15 with the cover in place or whether the cover 35 is removed when one of the switches 13 or 15 is turned ON. The inclusion of capacitor 48 produces powerful quick-acting braking.

During operation of the food processor in either the PULSE or RUNNING operation mode, with the novel circuit of either FIG. 1 or FIG. 2, the second capacitor 48 cannot be directly connected across the line voltage. When operating in the RUNNING mode with switch 13 closed, the path of current through the induction motor is through wires 5 and 6, switch armature 14 and connection 28, including closed switches 34 and 36. The circuit is completed through the lead 4. There is no direct electrical connection between lead 6 and the second capacitor 48.

Similarly, when operating in the PULSE mode with switch 15 closed and switch 13 open, the path of current through the induction motor is through wires 5 and 8, switch armature 16, electrical connection 22, and the other switch 14 and connection 28, including closed switches 34 and 36, with the circuit being completed through the lead 4. Again, there is no direct electrical connection between lead wire 8 and the second capacitor 48.

The resistor 52 is chosen to be of a value of only a few ohms for producing the fastest braking action consistent with minimizing undue current surge through the switch contacts at the instant of turning OFF. Its particular ohm value with depend upon the particular characteristics of the induction motor 24 involved. The less this resistance value the greater the braking effect.

As stated above, the capacitor 48 in either FIG. 1 or FIG. 2 is preferred to have a capacitance value considerably larger than the capacitance of the starting capacitor 44. As a practical guideline the second capacitor 48 should preferably have a capacitance value in the range from approximately 2 to 10 times the capacitance value of the starting capacitor 44.

In order to obtain the most powerful braking it is preferrable to have the various switches located on the "relay side" 39 of the motor as shown in FIGS. 1, 3 and 4, and therefore I consider FIG. 1 to be the best mode for employing this invention.

The description of the embodiments provided herein is intended to be illustrative, and not restrictive of the scope of the invention, that scope being defined by only the following claims and all equivalents thereto.

I claim:

1. In a home appliance such as a food processor having an electrical plug for connection to electrical power lines with a power cord extending from the plug to the appliance providing an energizing circuit, said appliance including a motor-driven tool operating in a region protected by a removable cover with an induction motor for driving said tool, said motor including first and second motor terminals, and at least one running winding connected in circuit between said terminals, a starting winding in series with a starting capacitor and starting means for temporarily connecting said starting capacitor and starting winding in series between said motor terminals for starting rotation of the motor rotor and for aiding in accelerating the rotor nearly to normal operating speed, said energizing circuit including a first power line connection extending between said plug and the first motor terminal and a second power line connection between said plug and the second motor terminal, said second power line connection including a cover interlock switch having a switch arm movable to an OFF position for interrupting said energizing circuit whenever the cover is removed from its normal position, the invention comprising:

a capacitive braking switching system for quickly braking the rotor whenever said energizing circuit is interrupted including:

a cover OFF terminal in said OFF-position of said cover interlock switch for engagement by said switch arm when said arm is in said OFF-position for placing said cover OFF terminal in conductive connection through said switch arm and through said second power connection with said second motor terminal, a second capacitor connected in circuit between said cover OFF terminal and a connection point located intermediate said first power connection and one of the windings of said motor, a first motor control switch including a first common terminal and first ON and first OFF terminals with a switch arm for selectively connecting one of the latter terminals with said first common terminal, a second motor control switch including a second common terminal and second ON and second OFF terminals with a switch arm for selectively connecting one of the latter terminals with said second common terminal, said first ON terminal and said second ON terminal each being connected through said second power connection with said plug, said second OFF terminal being connected to said cover OFF terminal, said first OFF terminal being connected to said second common terminal, and said first common terminal being connected through said second power line connection including said cover interlock switch with said second motor terminal, whereby neither said second capacitor nor said starting winding and starting capacitor can inadvertently be placed in circuit across the electrical power lines regardless of how said switches are operated, and whereby powerful, quick-acting braking action is provided whenever the induction motor is turned OFF either by removing the cover or by turning OFF both of said switches.

2. In a home appliance such as a food processor wherein said first motor terminal is a common terminal having the running winding(s) and starting winding connected directly thereto and wherein said starting means for temporarily connecting said starting capacitor and starting winding is connected to said second motor terminal, a capacitive braking switching system as claimed in claim 1, in which:

said cover OFF terminal is directly connected to a connection point in the motor located between said starting means and said starting capacitor, whereby both said second capacitor and said starting capacitor are effective in producing braking action whenever the induction motor is turned OFF either by removing the cover or by turning OFF both of said switches.

3. In a home appliance such as a food processor, a capacitive braking switching system as claimed in claim 1 or 2, in which:

said second capacitor has a capacitance value in the range from approximately 2 to 10 times the capacitance value of said starting capacitor.

4. In a home appliance such as a food processor, a capacitive braking switching system as claimed in claim 1 or 2, in which:

said second capacitor has a capacitance value in the range from approximately 2 to 10 times the capacitance value of said starting capacitor, and a resistor is in series with said second capacitor having a resistance value of only a few ohms, being less than eight ohms.

5. In a home appliance such as a food processor having an electrical plug for connection to electrical power lines with a power cord extending from the plug to the appliance providing an energizing circuit, said appliance including a motor-driven tool operating in a region protected by a removable cover with an induction motor for driving said tool, said motor including first and second motor terminals, and a running winding in series with a starting relay winding connected between said motor terminals, a starting winding in series with a starting capacitor and starting switch means responsive to said relay winding connected between said motor terminals for closing said starting switch means when the current through said running winding is significantly increased above the current level for running of the motor at normal operating speed, said energizing circuit including a first power line connection extending between said plug and the first motor terminal and a second power line connection between said plug and the second motor terminal, said second power line connection including a cover interlock switch having a switch arm movable between an ON and an OFF position for completing said energizing circuit when said arm is in its ON position and for interrupting said energizing circuit by moving into its OFF position whenever the cover is removed from its normal position, the invention comprising:

a capacitive braking switching system for quickly braking the motor whenever said energizing circuit is interrupted including:

a cover OFF terminal in said OFF-position of said cover interlock switch for engagement by said switch arm when said arm is in its OFF-position, said second power line connection connecting said switch arm with said second motor terminal, a second capacitor connected in circuit between said cover OFF terminal and a connection point located on the side of the motor circuit where said first motor terminal is located, a first motor control switch including a first common terminal and first ON and first OFF terminals with a switch arm for selectively connecting one of the latter terminals with said first common terminal, a second motor control switch including a second common terminal and second ON and second OFF terminals with a switch arm for selectively connecting one of the latter terminals with said second common terminal, said first ON terminal and said second ON terminal each being connected through said second power connection with said plug, said second OFF terminal being connected to said cover OFF terminal, said first OFF terminal being connected to said second common terminal, and said first common terminal being connected through said second power line connection including said cover interlock switch with said second motor terminal, whereby neither said second capacitor nor said starting winding and starting capacitor can inadvertently be placed in circuit across the electrical power lines regardless of how said switches are operated, and whereby powerful, quick-acting braking action is provided whenever the induction motor is turned OFF either by removing the cover or by turning OFF both of said switches.

6. In a home appliance such as a food processor wherein said first motor terminal is a common terminal having said running winding and starting winding connected directly thereto and wherein said relay winding is connected to said second terminal and wherein said starting switch means is connected between said second terminal and said starting capacitor, a capacitive braking switching system as claimed in claim 5, in which:

a connection point is located in said motor between said starting switch means and said second capacitor, and said connection point is connected directly to said cover OFF position, whereby both said second capacitor and said starting capacitor are employed in braking the motor regardless of whether the motor is turned OFF by removing the cover or by turning OFF both of said control switches.

7. In a home appliance such as a food processor, a capacitive braking switching system as claimed in claim 5 or 6, in which:

said second capacitor has a capacitance value in the range from approximately 2 to 10 times the capacitance value of said starting capacitor.

8. In a home appliance such as a food processor, a capacitive braking switching system as claimed in claim 5 or 6, in which:

said second capacitor has a capacitance value in the range from approximately 2 to 10 times the capacitance value of said starting capacitor, and a resistor is in series with said second capacitor having a resistance value of only a few ohms, being less than eight ohms.

* * * * *